US011311358B1

United States Patent
Vuillemot

(10) Patent No.: US 11,311,358 B1
(45) Date of Patent: Apr. 26, 2022

(54) DENTAL RESTORATION DEVICES AND METHODS

(71) Applicant: William C. Vuillemot, DeWitt, MI (US)

(72) Inventor: William C. Vuillemot, DeWitt, MI (US)

(*) Notice: Subject to any disclaimer, the term of this patent is extended or adjusted under 35 U.S.C. 154(b) by 0 days.

(21) Appl. No.: 17/360,078

(22) Filed: Jun. 28, 2021

(51) Int. Cl.
*A61C 13/20* (2006.01)
*A61C 13/34* (2006.01)

(52) U.S. Cl.
CPC .............. *A61C 13/20* (2013.01); *A61C 13/34* (2013.01)

(58) Field of Classification Search
CPC ................................ A61C 13/20; A61C 13/34
See application file for complete search history.

(56) References Cited

U.S. PATENT DOCUMENTS

| | | | | |
|---|---|---|---|---|
| 3,224,050 A * | 12/1965 | Redtenbacher | .......... | A61C 5/77 164/246 |
| 4,129,946 A * | 12/1978 | Kennedy | .................. | A61C 5/77 433/37 |
| 5,890,896 A * | 4/1999 | Padial | .................. | A61C 9/0026 433/40 |
| 6,589,053 B2 | 7/2003 | Bills | | |
| 6,790,035 B2 * | 9/2004 | Tricca | ...................... | A61C 7/00 433/6 |
| 7,092,780 B2 * | 8/2006 | Ganley | ............. | A61C 13/0004 700/117 |
| 7,217,131 B2 | 5/2007 | Vuillemot | | |
| 8,366,445 B2 | 2/2013 | Vuillemot | | |
| 8,696,356 B2 | 4/2014 | Hegyi et al. | | |
| 9,119,692 B2 | 9/2015 | Sun et al. | | |
| 10,952,815 B2 | 3/2021 | Mishaeloff | | |
| 2018/0206956 A1 * | 7/2018 | Pierson | ................ | A61C 9/0013 |
| 2018/0280116 A1 * | 10/2018 | Hansen | .................... | A61C 5/77 |
| 2018/0360577 A1 | 12/2018 | Hansen et al. | | |
| 2019/0083208 A1 * | 3/2019 | Hansen | .............. | A61C 13/0019 |
| 2019/0298489 A1 | 10/2019 | Dingeldein et al. | | |

FOREIGN PATENT DOCUMENTS

WO WO2020/058855 A1 3/2020

* cited by examiner

*Primary Examiner* — Nicholas D Lucchesi
(74) *Attorney, Agent, or Firm* — Gunther Evanina; Butzel Long

(57) ABSTRACT

Processes and devices for dental restorations employ molding tools that isolate individual tooth surfaces onto which dental composite material is to be applied and cured into individual cavities to prevent bonding of adjacent teeth. The processes and tools utilize matrix separators between teeth and a molding tool having matrix guide pockets that receive edges of the matrix separators to define the individual cavities.

12 Claims, 5 Drawing Sheets

DENTAL RESTORATION DEVICES AND METHODS

FIELD OF THE DISCLOSURE

This disclosure relates to methods and devices for treating patients having dental structure in need of restoration, and more particularly to injection molding techniques for restoring a plurality of tooth structures concurrently in a single mold tool.

BACKGROUND OF THE DISCLOSURE

There are several methods that attempt to reduce the time, skilled manipulation, and effort needed to restore dental structure, particularly, those structures including a plurality of adjacent teeth or a plurality of upper or lower teeth in close proximity to one another.

U.S. Pat. No. 7,217,131 issued to the present inventor, William C. Vuillemot, discloses a method for restoring teeth by covering selected teeth which are not to be restored with a release material (e.g., polytetrafluoroethlene), fitting a clear polymer composition mold over the teeth that are to be restored, injecting a molding fluid polymer composition into the cavities between the mold and teeth, curing the fluid polymer composition, and removing the mold. However, in order to prevent adjacent teeth from becoming fused together during the resin injection and curing steps, it is necessary to restore a plurality of adjacent teeth in two separate applications. This includes covering every other tooth with a polymer release material (e.g., PTFE tape) during a first application, then repeating the entire process for the teeth that were covered in the first application. It would be desirable to provide an improved process that eliminates the need for covering teeth that are not to be restored with a release material, and to eliminate the need for separate passes, while preventing adjacent teeth from being fused together during resin injection and curing.

U.S. Pat. No. 8,366,445 also issued to the present inventor, William C. Vuillemot, discloses a method of forming a dental mold by scanning dental structures to generate a three-dimensional first digital model of the existing dental structure that is to be restored, modifying the first digital model to generate a second digital model of the planned restoration, and creating a multiple part mold assembly from the second digital model. The improved method produces an extremely accurate mold with precise dimensions, while reducing the labor needed to prepare the molding tool. However, as with the previously described method, it is desirable to restore the teeth in multiple passes by isolating every other tooth in a first pass, then isolating the restored teeth in a second pass, in order to prevent adjacent teeth from becoming fused together. Alternatively, the patent teaches that a small dental knife or dental saw can be used to remove cured resin within interstitial positions between adjacent teeth when a single pass is used without release material. It would be desirable to provide a restoration method that allows a single pass without requiring release material or removal of cured resin within interstitial positions between adjacent teeth, and which does not require removal of cured resin from between adjacent teeth.

SUMMARY OF THE DISCLOSURE

Disclosed are processes for making molding tools for use in dental restoration, the resulting dental restoration molding tools, matrix separators, and dental restoration processes using the molding tools and matrix separators. The disclosed processes and devices isolate individual tooth surfaces onto which dental composite material is to be applied and cured into individual cavities (void volumes) to prevent cured dental composite material from entering into interproximal spaces between adjacent teeth, thereby preventing adjacent teeth from being fused together during the restoration. This eliminates the need for cutting or sawing cured resin from between adjacent teeth, and the need for multiple passes, as required by the known process described in the Background of the Disclosure.

The problems addressed by this disclosure are solved, at least in part, by providing a molding tool having matrix guide pockets that each receive edges of a corresponding matrix separator disposed within an interproximal space between adjacent teeth. Matrix separators on either side of a tooth, the surface of the tooth to which dental composite material is to be added and cured, and the molding tool together define a cavity isolated from the gingival tissue and adjacent teeth, thereby preventing adjacent teeth from becoming fused together.

A disclosed process for making the molding tool involves preparing a physical model of a planned dental structure, positioning matrix separators into interproximal spaces between adjacent teeth of the physical model, forming a transparent molding tool over the physical model and installed matrix separators, and removing the completed molding tool with integrally formed guide pockets from the physical model.

In a slightly modified process, separately fabricated matrix guides defining a pocket for receiving edges of the matrix separators are positioned over the matrix separators, the interproximal spaces between adjacent teeth, and the mold is formed over the model, separators, and matrix guides. The matrix guides are preferably provided with knobs, knurls or other protuberances that are used to mechanically interlock the outer surfaces of the matrix guides to the molding tool, such that the completed molding tool can be removed from the model with the matrix guides physically and/or adhesively attached to the molding tool.

The resulting molding tools have a transparent molding tool body having contours that correspond with a planned restoration, and include a plurality of matrix guide pockets, each pocket configured for receiving edges of a corresponding matrix separator positioned at an interproximal space between adjacent teeth. In one embodiment, the matrix guide pockets are defined by separately fabricated matrix guides that are integrally attached to the molding tool body. In another embodiment, the matrix guide pockets are integrally formed of the material of which the molding tool body is comprised.

In a disclosed embodiment, the matrix separator includes a gingival end that is branched into a Y-shape to cover gingival surfaces between adjacent teeth.

The disclosed dental restoration process involves providing a molding tool as described, preparing existing dental structure for restoration, positioning matrix separators into interproximal spaces between adjacent teeth that are to be restored, positioning the molding tool over the existing dental structure and matrix separators, with the edges of each matrix separator received in a corresponding one of the guide pockets of the molding tool, injecting a flowable dental composite material into at least one mold cavity defined by the separators, dental structure and molding tool surfaces, curing the composite material, and removing the molding tool and matrix separators from the restored dental structure.

DETAILED DESCRIPTION

Disclosed are molding tools, interproximal matrix separators, processes for making molding tools, and processes for treating existing dental structure in need of restoration using the disclosed molding tools and interproximal matrix separators. The processes and devices described are expected to significantly simplify dental restoration procedures, reduce the effort needed to achieve an aesthetically and functionally excellent result, and reduce procedure time and patient discomfort.

Figure 1:
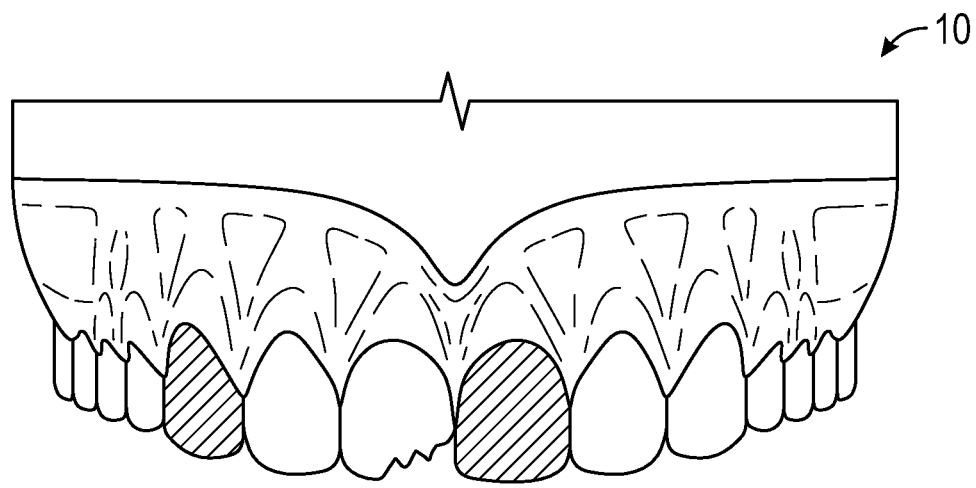
FIG. 1 is a front view of a model of an existing dental structure that is in need of restoration.
Figure 2:
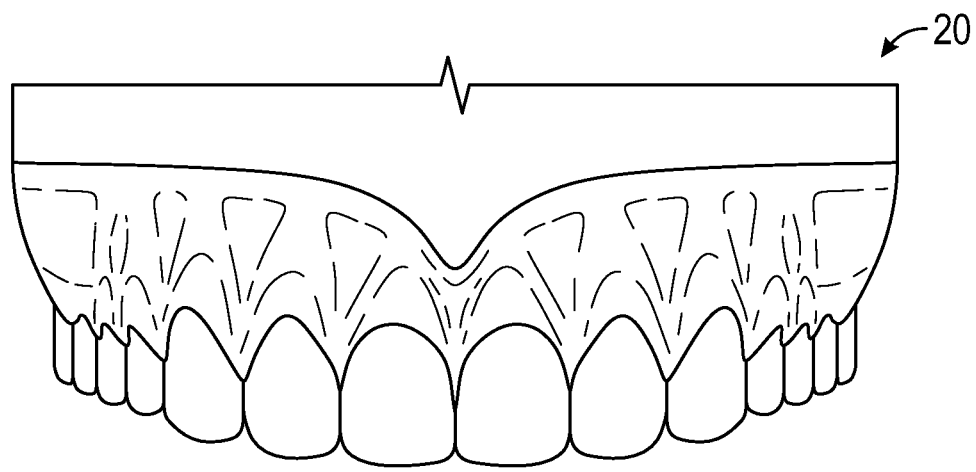
FIG. 2 is a front view of a model of an aesthetically and/or functionally improved dental structure representing a planned restoration of the existing dental structure.

In a process for making a molding tool for use in dental restorations, a physical model of a planned dental structure is prepared. The physical model can be prepared using any known or other suitable technique. A well-known technique involves making a dental impression (i.e., a negative imprint of teeth and surrounding soft tissue) from which a positive reproduction or model 10 (FIG. 1) of a patient's existing dental structure can be formed of dental stone or other suitable material. The positive reproduction can be modified by addition of material (e.g., dental wax) and sculpted by hand to develop a model of the planned dental structure 20 (FIG. 2). A preferred technique involves first creating a digital impression using three-dimensional (3D) digital scanners to generate a digital model of the existing dental structure, and modifying the digital model of the existing structure (e.g., with the aid of CAM/CAD software) to generate a digital model of the planned structure. Such technique is described, for example, in U.S. Pat. No. 8,366,445. The digital model of the planned structure can then be used to produce a physical model using milling or stereolithographic techniques.

After the physical model of the planned dental structure has been produced, the next step in the process for making the molding tool disclosed herein involves positioning a matrix separator 22 into each of the interproximal spaces between adjacent teeth of the physical model of the planned dental structure. Dental matrices are thin, flat or contoured sheets of material (e.g., stainless steel, polyester, mylar, etc.) that are commonly used for interproximal restorations, such as to help create the outside contour of the restorative material. As used herein, the expression "matrix separator" is used to refer to a thin strip of material suitable for placement into the interproximal space between adjacent teeth that are part of the planned restoration. The matrix separators are sized so that the lingual edge, the buccal edge, and the occlusal edge of each matrix separator can be positively engaged by a pocket or grooves in the molding tool, such that a mold cavity can be defined by existing tooth structure prepared for restoration, an interior surface of the molding tool, and matrix separators at adjacent interproximal spaces. The processes and devices disclosed herein can be used for restoring a single tooth, but are much more beneficially employed for restoring a plurality of teeth concurrently, with the molding tool and matrix separators defining a plurality of separate mold cavities, each associated with a tooth being restored. Suitable matrix separators have a thickness of from about 0.3 mm to about 0.7 mm, a length corresponding approximately to the distance from the occlusal edge (or incisal edge) of the teeth defining the interproximal space to the gingival tissue associated with the interproximal space. This length can range from about 5 mm to about 15 mm. The width of the matrix separators can also range from about 5 mm to about 10 mm. Metal (e.g., stainless steel, nickel, etc.) matrix separators can be employed. However, transparent mylar or polyester matrix separators are preferred to facilitate rapid radiation (e.g., ultraviolet radiation) curing of dental composite compositions that are used in a restoration.

A preferred matrix separator 22 (FIG. 4) includes a branched or Y-shaped (gingival) end 24, wherein the branches can be spread along the interdental papilla (gingival tissue between teeth) to prevent contact between dental composite material and the interdental papilla during a restoration. The matrix separator with branched ends can be made by melt bonding or adhesively bonding together two plastic sheets over most of the length of the sheets, while leaving the ends not bonded together. The free ends that are not bonded together can be heated, curled slightly and cooled to lock them into a desired Y-shape.

Figure 3:
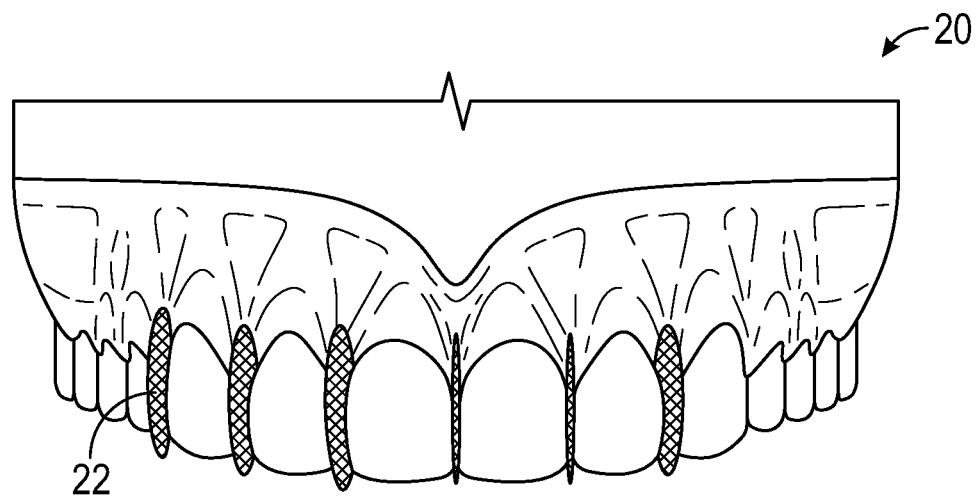
FIG. 3 is a front view of the model of the planned restoration with matrix separators positioned at the interproximal spaces between teeth of the model corresponding with teeth of a patient that are to be restored.
Figure 4:
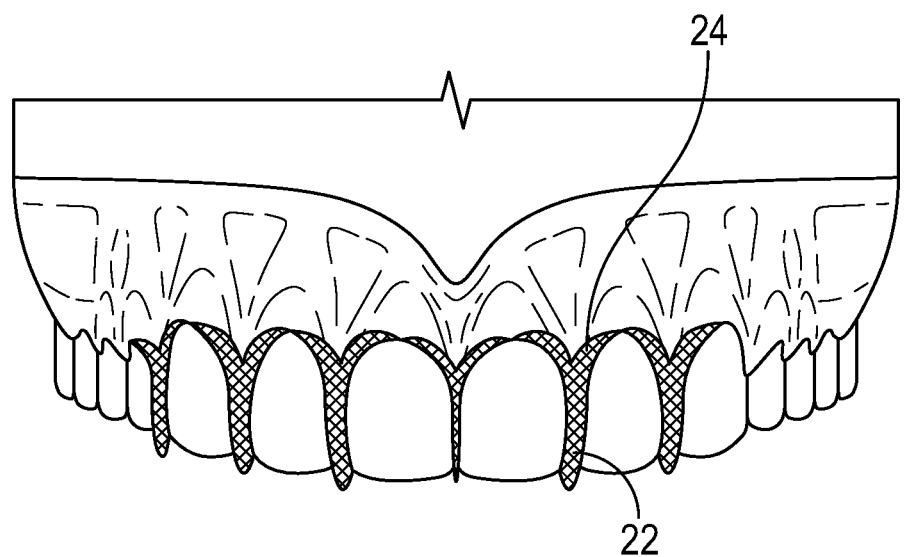
FIG. 4 is a front view similar to FIG. 3, except using matrix separators having branched ends that can conform with and cover simulated gingival tissue between adjacent teeth of the model.

After the matrix separators 22 have been positioned into the interproximal spaces between adjacent teeth of the physical model of the planned dental structure (as shown in FIG. 3 or FIG. 4), the next step in the process is forming a transparent molding tool 60 over the physical model of the planned dental structure and over the installed matrix separators, such that the edges of the matrix separators are embedded or protrude into the molding tool material. This can be done by placing the physical model 20 of the planned dental structure into a tray 25 containing, or to which is added, a curable liquid material 26 (e.g., a biocompatible photo-curable polymer composition), such that the simulated teeth and simulated gingival tissue of the physical model 20 and installed separators are surrounded by the material 26. Suitable biocompatible photo-polymerizable polymer compositions that can be used as molding material 26 for preparing molding tool 60 are well known and commercially available. Material 26 can be added to tray 25 and surround model 20 and separators 22 as a liquid that can be cured or hardened (such as with ultraviolet radiation) to form the solid molding tool. Examples of photo-curable compositions that can be used include vinyl resin compositions and silicone resin compositions. After the molding tool material has cured or hardened to form molding tool 60, tray 25 is separated from the molding tool, and the molding tool is separated from physical model 20 of the planned restoration and from matrix separators 22, leaving grooves defining matrix guide pockets. Suitable techniques for separating the tray from the mold tool, and separating the molding tool 60 from the model 20 are well known and described, for example, in U.S. Pat. No. 7,217,131. The resulting molding tool has interior surfaces contoured to correspond with the planned restoration, and a plurality of matrix guide pockets (e.g., grooves) for receiving buccal, lingual and occlusal (or incisal) edges of a corresponding matrix separator 22 positioned into an interproximal space between adjacent teeth of the patient that are to be restored.

Figure 5A:
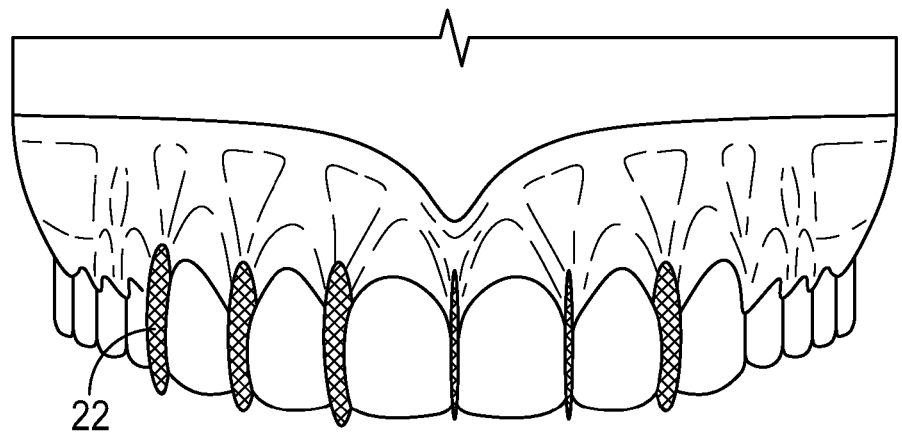
FIG. 5A is a front view of the model of FIG. 3 with matrix separators immersed in a material used to fabricate the molding tool.
Figure 5B:
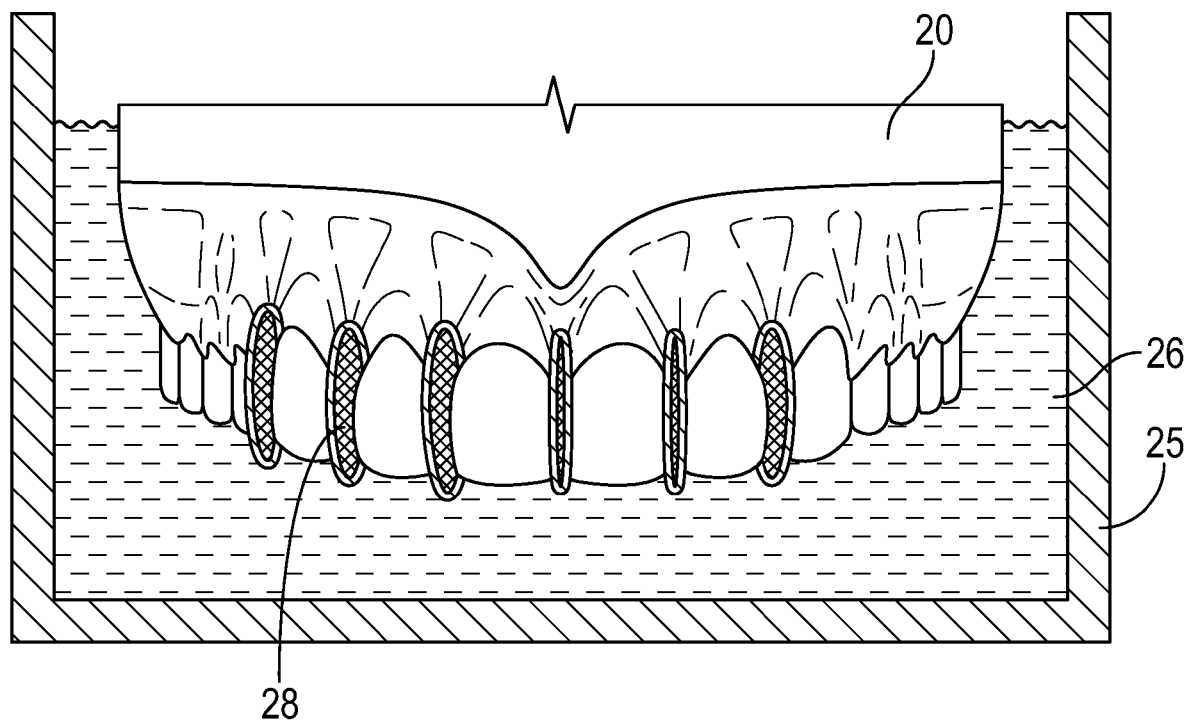
FIG. 5B is a front view of the model of FIG. 3 with matrix guides disposed over the matrix separators and with the model, matrix separators, and matrix guides immersed in a material used to fabricate the molding tool.
Figure 6:
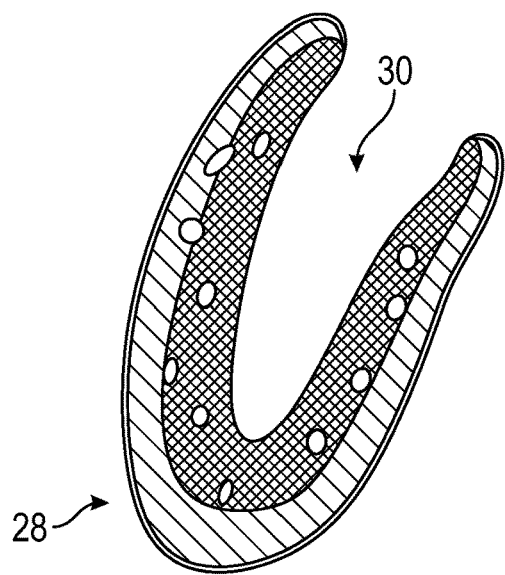
FIG. 6 is a side view of a matrix guide as shown in FIG. 5.
Figure 7A:
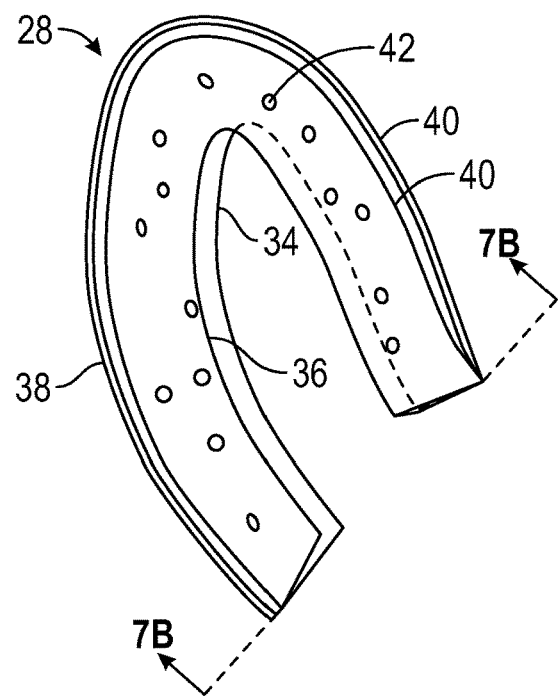
FIG. 7A is a perspective view of a matrix guide as shown in FIGS. 5 and 6.
Figure 7B:
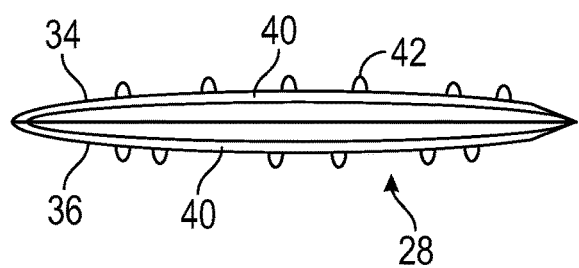
FIG. 7B is a side view of the matrix guide as seen along lines 7B-7B of FIG. 7A.

In an alternative process for making a molding tool for use in dental restorations, a physical model of a planned dental structure is prepared, such as previously described, and matrix separators are positioned into interproximal spaces between adjacent teeth of the physical model of the planned structure, such as previously described. Thereafter, a matrix guide 28 is provided for each matrix separator (FIG. 5B). Each matrix guide defines a pocket 30 for receiving buccal, lingual and occlusal (or incisal) edges of a corresponding matrix separator. The matrix separator can be comprised of two overlapping transparent plastic sheets 34, 36 having generally U-shaped or V-shaped profiles, that are joined (such as by heat bonding) at their outer edges 38 and not joined along their inner edges 40, whereby a pocket for receiving edges of matrix separator 22 is developed. The outer surfaces of the matrix guide can be provided with knobs 42, knurls or other protuberances or features that mechanically lock the matrix guides into the molding tool as it is formed. The same materials used to prepare transparent matrix separators (e.g., 0.3 mm to 0.7 mm thick mylar or polyester sheet material) can be used to prepare the matrix guides. The resulting molding tool is generally similar to the previously described molding tool, except the matrix guide pockets are defined by separately fabricated matrix guides that are integrally attached (e.g., bonded to and/or mechanically interlocked) to the molding tool body (rather than grooves defined by the molding tool body itself).

Figure 8:
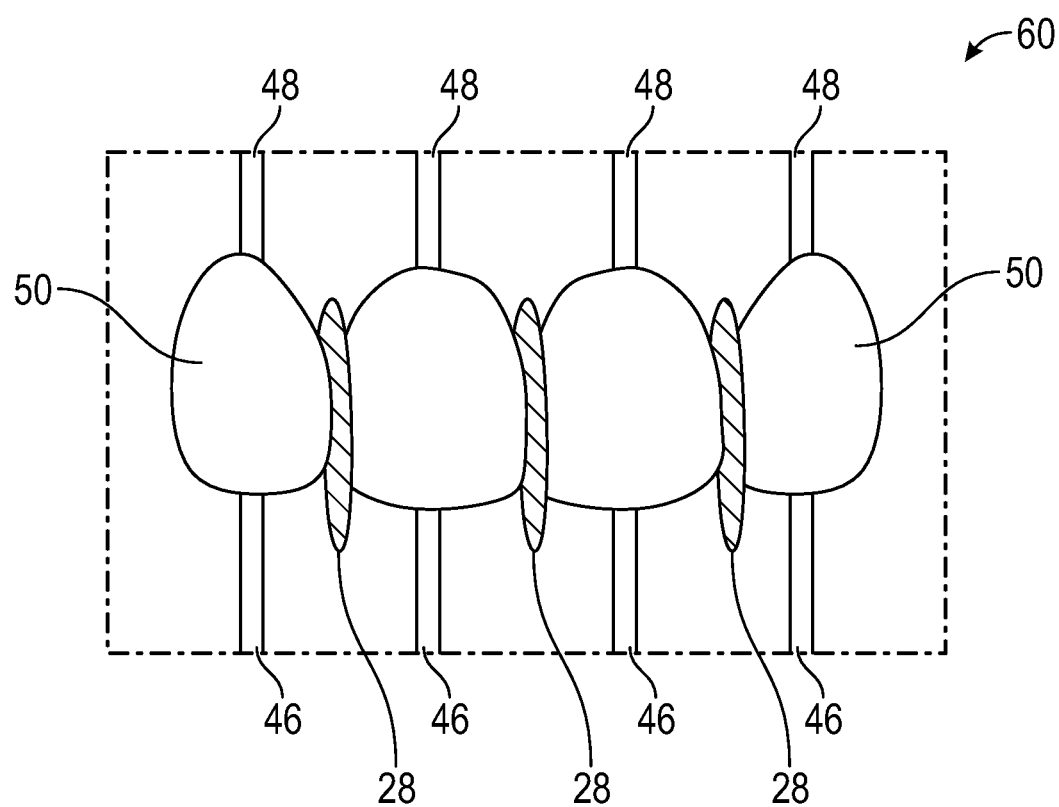
FIG. 8 is a front view of a molding tool for dental restoration in which matrix guide pockets are integrally formed of the material used to fabricate the molding tool body.

In any of the described embodiments, injection ports 46 are provided for introducing a dental composite material (i.e., a flowable resin-based, curable composition, typically comprising an inorganic filler such as silicon dioxide) into each of the mold cavities 50 defined by the molding tool 60, dental structure and matrix separators; and vent ports 48 are provided to allow air to escape from the mold cavities as they are filled with dental composite (see FIG. 8).

Further alternative methods of preparing molding tool 60 include milling a solid block of material (e.g., plastic) to create a negative profile of the digital model of the planned structure (discussed previously), or to employ stereolithographic (three-dimensional printing) additive manufacturing techniques to directly print the desired molding tool based on the digital model of the planned structure (i.e., the planned restoration).

The process for treating existing dental structure in need of restoration involves first providing a transparent molding tool having interior surface contours corresponding with a planned restoration and having a plurality of matrix guide pockets for receiving buccal, lingual and occlusal edges of a corresponding matrix separator positioned at interproximal spaces between adjacent teeth of the existing dental structure. Either the molding tool with separately fabricated matrix guides integrally attached to the molding tool body, or the molding tool with guide pockets integrally formed of the material of the molding tool body can be used. Before placing the molding tool over the existing dental structure that is to be restored, the existing dental structure is prepared for restoration. This may involve drilling (such as to remove decay or old fillings), milling (such as to remove excess material causing unwanted occlusal contact between teeth) and preparing enamel and dentin tooth surfaces for bonding with dental composite material. A typical procedure for preparing tooth surfaces for bonding with dental composite material includes lightly scuffing or roughening the surfaces (such as with a fine diamond bur), etching with 35% phosphoric acid gel for about 20 seconds, and rinsing with water. Non-viscous bonding agent can be applied to tooth surfaces and cured (such as with ultraviolet radiation) to create a hybrid layer that is suitable for receiving a composite resin for producing the restoration. After the teeth have been prepared for restoration, a matrix separator is placed into each of a plurality of interproximal spaces between adjacent teeth of the existing dental structure, then the molding tool is positioned over the existing dental structure that has been prepared for restoration and over the matrix separators, with the buccal, lingual and occlusal edges of each matrix separator received in a corresponding one of the matrix guide pockets. This creates a plurality of mold cavities separated from one another by the matrix separators, whereby a plurality of teeth can be restored concurrently with a single molding tool installation without requiring sawing of cured dental composite material from between adjacent teeth. After the molding tool is installed over the teeth that have been prepared for restoration and over the matrix separators, a flowable dental composite material is injected into each of the mold cavities through the injection port associated with each cavity until filled. Thereafter, the dental composite resin is cured (such as with ultraviolet radiation, the introduction of which is facilitated by the transparency of the molding tool, and preferably the transparency of the matrix separators). After curing, the molding tool and matrix separators are removed from the restored dental structure.

The described embodiments are preferred and/or illustrated, but are not limiting. Various modifications are considered within the purview and scope of the appended claims.

What is claimed is:

1. A process for making a molding tool for use in dental restorations, comprising:
   preparing a physical model of a planned dental structure;
   positioning a matrix separator into interproximal spaces between adjacent teeth of the physical model of the planned dental structure;
   forming a transparent molding tool over the physical model of the planned dental structure and installed matrix separators, such that surface contours of the molding tool define a plurality of matrix guide pockets for receiving buccal, lingual and occlusal edges of the corresponding matrix separator; and
   removing the molding tool with integrally formed matrix guide pockets from the physical model of the planned dental structure.

2. The process of claim 1, wherein the matrix separators are comprised of a transparent plastic material.

3. The process of claim 1, further comprising:
- providing a matrix guide for each matrix separator, each matrix guide defining a pocket for receiving buccal, lingual and occlusal edges of the corresponding matrix separator; and
- positioning each matrix guide over the corresponding matrix separator before forming the transparent molding tool guide over the physical model.

4. The process of claim 3, wherein the matrix separators are comprised of a transparent plastic material.

5. The process of claim 3, wherein the matrix guides are comprised of a transparent plastic material.

6. The process of claim 5, wherein the matrix guides have opposite surfaces that are provided with protrusions to facilitate mechanical interlocking engagement with the molding tool body.

7. A molding tool for use in dental restorations, comprising:
- a transparent molding tool body having contours corresponding with a planned restoration, the molding tool having a plurality of matrix guide pockets for receiving buccal, lingual and occlusal edges of a corresponding matrix separator installed into interproximal spaces between adjacent teeth of the planned restoration.

8. The molding tool of claim 7, wherein each of the matrix guide pockets is defined by a separately fabricated matrix guide that is integrally attached to the molding tool body.

9. The molding tool of claim 8, wherein the matrix guides are comprised of a transparent plastic material.

10. The molding tool of claim 7, wherein each of the matrix guide pockets is integrally formed of the material of the molding tool body.

11. The molding tool of claim 7, wherein the matrix guides have opposite surfaces that are provided with protrusions to facilitate mechanical interlocking engagement with the molding tool body.

12. A process for treating existing dental structure in need of restoration, comprising:
- providing a transparent molding tool having interior surface contours corresponding with a planned restoration and having a plurality of matrix guide pockets for receiving buccal, lingual and occlusal edges of a corresponding matrix separator positioned at interproximal spaces between adjacent teeth of the existing dental structure;
- preparing the existing dental structure of a patient for restoration;
- positioning a matrix separator into each of a plurality of interproximal spaces between adjacent teeth of the existing dental structure that has been prepared for restoration;
- positioning the molding tool over the existing dental structure that has been prepared for restoration and over the matrix separators, with the buccal, lingual and occlusal edges of each matrix separator received in a corresponding one of the guide pockets;
- injecting a flowable dental composite material into at least one mold cavity defined by surfaces of the existing dental structure that has been prepared for restoration, the interior surface contours of the molding tool, and the matrix separators at adjacent interproximal spaces;
- curing the dental composite material; and
- removing the molding tool and matrix separators from restored dental structure.

\* \* \* \* \*